Figure 1:
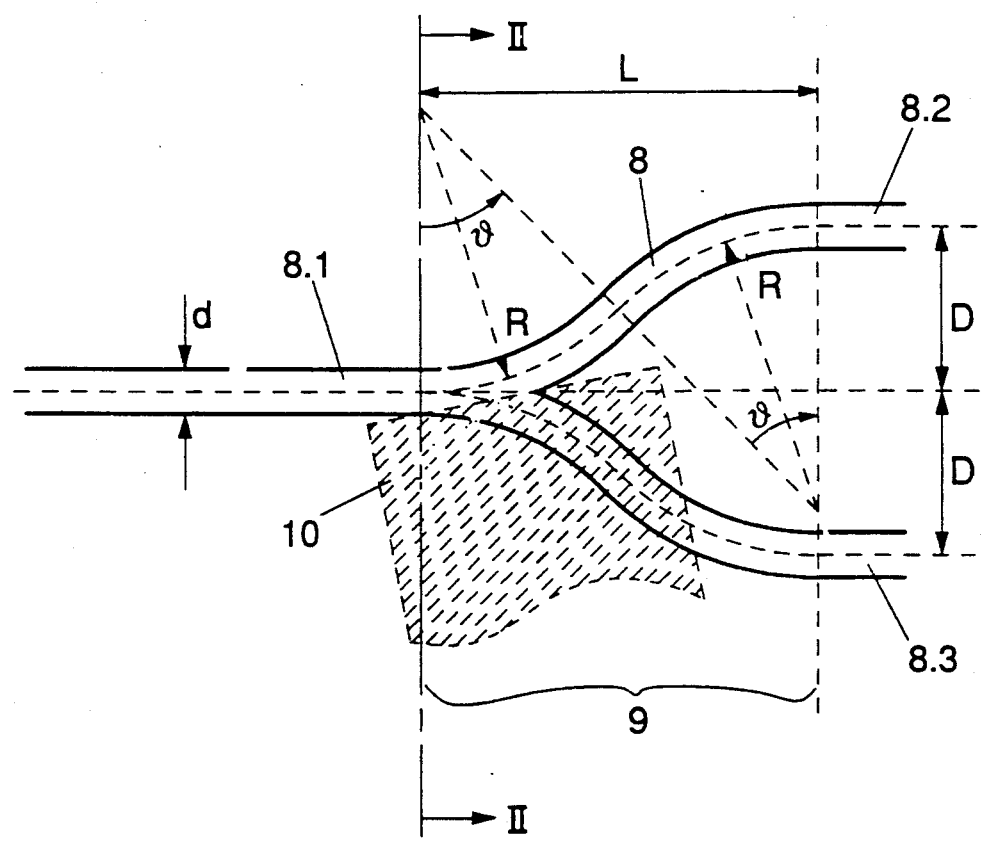

United States Patent [19]

Diemeer et al.

[11] Patent Number: 5,056,883
[45] Date of Patent: Oct. 15, 1991

[54] INTEGRATED OPTICAL POLARIZATION SPLITTER

[75] Inventors: Martinus B. J. Diemeer; Johannes J. G. Maria van der Tol, both of Zoetermeer, Netherlands

[73] Assignee: Koninklijke Ptt Nederland N.V., Groningen, Netherlands

[21] Appl. No.: 646,360

[22] Filed: Jan. 25, 1991

[30] Foreign Application Priority Data

Jan. 29, 1990 [NL] Netherlands .................... 9000210

[51] Int. Cl.$^5$ .................................................. G02B 6/10
[52] U.S. Cl. ........................................ 385/8; 385/132; 385/16
[58] Field of Search ............... 350/96.11, 96.12, 96.13, 350/96.14

[56] References Cited

U.S. PATENT DOCUMENTS

| | | | |
|---|---|---|---|
| 3,920,314 | 11/1975 | Yajima | 350/96.12 |
| 4,070,092 | 1/1978 | Burns | 350/96.14 |
| 4,772,084 | 9/1988 | Bogert | 350/96.15 |
| 4,869,569 | 9/1989 | Kapon | 350/96.12 |
| 4,911,513 | 3/1990 | Valette | 350/96.12 |
| 5,007,696 | 4/1991 | Thackara et al. | 350/96.14 |

FOREIGN PATENT DOCUMENTS 0290061 3/1988 European Pat. Off. .
0344857 12/1989 European Pat. Off. .

OTHER PUBLICATIONS

SPIE, vol. 971, *Nonlinear Optical Properties of Organic Materials*, (1988), R. Lytel et al., pp. 218–229.
IEE Proceedings, vol. 136, Pt. J., No. 3, Jun. 1989, P. Kaczmarski, "Design of an Integrated Electro-Optic Switch in Organic Polymers", pp. 152–158.
*Journal of Lightwave Technology*, vol. 7, No. 10, Oct. 1989, N. Goto et al., "A TE-TM Mode Splitter in LiNbO$_3$ by Proton Exchange and Ti Diffusion", pp. 1567–1574.

Primary Examiner—Frank Gonzalez
Attorney, Agent, or Firm—Frishauf, Holtz, Goodman & Woodward

[57] ABSTRACT

The invention relates to an integrated optical polarization splitter based on the mode filter principle, in which the asymmetry, necessary therefor, of the waveguides is obtained by using a polable glassy polymer as optical waveguide material, which material is polarization-sensitive in the poled state and is not, or virtually not polarization-sensitive in the unpoled state. A Y-shaped optical waveguide pattern 8 of polable glassy polymer comprises a continuous optical waveguide formed by the optical waveguide sections 8.1 (incoming) and 8.2 (outgoing) in which the polymer is in the unpoled state and an outgoing optical waveguide section 8.3 which connects to said optical waveguide at an acute angle and in a tapered fashion and in which the polymer is in the poled state. Since the poled material is also electro-optical, an electric field, for example generated between electrodes 2 and 10, can still correct any small deviations in the asymmetry. Advantages are simple production, with relatively high tolerances, and a short integration length of the component.

4 Claims, 1 Drawing Sheet

INTEGRATED OPTICAL POLARIZATION SPLITTER

A. BACKGROUND OF THE INVENTION

1. Field of the invention

The invention is in the field of integrated optical components. The invention comprises an integrated optical polarization splitter based on the mode filter principle.

2. Background to the invention

Optical polarization splitters, also termed TE-TM mode splitters, are used, for example, in coherent optical detection systems. Such systems solve the problem that the polarization state of the light carrying information, which light is usually presented via a standard monomode glass fiber, may fluctuate, inter alia due to the use of the so-called polarization diversity (PD) system. According to this system, the light received is split into two components having mutually perpendicular polarization directions with the aid of a polarization splitter. The two components are then detected and processed separately. An integrated coherent optical detection system requires, of course, an optical polarization splitter in integrated form. Hitherto known polarization splitters have been based, inter alia, on the principle of mode filtering. This principle implies that, in the case of waveguides which approach one another, the optical field distribution in the interaction region where the waveguides come together depends on the extent to which the waveguides resemble one another.

If they are identical, two independent waves are produced in said interaction region: a so-called even mode and a so-called odd mode of equal intensity. If the guides are, however, different, i.e. asymmetrical, for example in the width, the even and the odd modes are no longer equally intensely initiated: if the light enters via the guide with the lowest propagation constant, the odd mode becomes more intense, but via the other guide it is precisely the even mode which is initiated more intensely. If the asymmetry between the guides is just great enough, only one mode is initiated. However, it is the case that the greater the angle between the guides, the greater the asymmetry required. Precisely the opposite applies for waveguides which remove the light from the interaction region and therefore recede from one another: if the asymmetry is sufficient, the even mode proceeds completely in the outgoing guide having the highest propagation constant and the odd mode precisely via the other.

Thus, an asymmetry provided between the incoming waveguides produces a selective initiation of the even or odd mode in the interaction region; an asymmetry in the outgoing guides produces a selective coupling out of the even or odd mode in each of the outgoing waveguides. The direction of the asymmetry determines which mode belongs to which guide. When applied to a polarization splitter, this means that the asymmetry is so chosen that it becomes different in sign for the TE polarization than for the TM polarization at right angles thereto. This may occur either at the input side or at the output side. If the output side is equipped in this manner and the input side is so constructed that it comprises an input channel which can conduct both polarizations in the fundamental mode, this polarization splitter operates as follows. The incoming waveguide injects light which contains both the TE and the TM polarization. Each of these polarizations in said (even) fundamental mode will then be coupled out at the output side via the guide having the highest propagation constant for that polarization. In this way, splitting of polarizations is brought about.

Such a polarization splitter based on a mode filter is known from reference [1] (see C). This known splitter is provided on a substrate of LiNbO$_3$ (zero-degree cut) and is based on a combination of a standard optical waveguide obtained by Ti diffusion and a polarization-sensitive optical waveguiding side branch connected thereto at an acute angle ($\theta$). The polarization-sensitive optical waveguide is provided in/on the substrate by means of a "proton-exchange" (PE) process. This process achieves the result that the extraordinary refractive index $n_e$ has increased at the position of the guide, while the ordinary refractive index $n_o$ has decreased somewhat. The Ti waveguide and the PE side branch can have mutually different widths and the connection of the PE branch is tapered.

However, this known polarization splitter requires a very critical geometry and is therefore fairly laborious from a production-engineering point of view. A good splitting of the polarizations moreover requires a very acute angle ($\theta \leq 0.01$ rad for a suppression of up to 20.0 dB), with the result that the required length is relatively great.

B. SUMMARY OF THE INVENTION

The object of the invention is to provide an integrated optical polarization splitter, also based on the mode filter principle, which splitter does not have the abovementioned disadvantages. An optical component for splitting an incident light signal into two outgoing light signals having mutually perpendicular polarization directions, which component comprises an optical waveguide pattern provided on or in a substrate, including an essentially polarization-insensitive first channel-type optical waveguide and at least one polarization-sensitive second channel-type optical waveguide which joins the first optical waveguide as a side branch at an acute angle is characterized, according to the invention, in that the optical waveguide pattern is composed of a polable transparent material which is in the unpoled state in the first optical waveguide and in the poled state in the second optical waveguide at least in the portion which connects directly to the first optical waveguide.

The invention is based on the property that a polable transparent material of the type as known from the references [2] and [3] is polarization-sensitive in the poled state and is not, or virtually not, polarization-sensitive in the unpoled state. As is known from reference [3], a polymer of this known type can also be converted, on exposure to an exciting irradiation (for example UV light), to a third state in which the material has lost its power of electro-optical activity. This appears, however, to imply that it has also lost its polability. In addition, it is known from this reference that the irradiation also brings about a lowering of the refractive index with respect to the unirradiated material, which means that the material provided on irradiation, provided it is dimensioned as such, can function as optical waveguide both in the poled and unpoled state. Preferably, the invention then also has the characteristic that the said optical waveguide pattern is provided in a thin layer of polable glassy polymer on selective irradiation.

An optical component according to the invention has the following advantages:

The component is broad-band, that is to say that the good polarization splitting action extends over a very large wavelength range;

the polarization separation is very good if not better compared with known TE-TM mode splitters;

the production is simple and the tolerances are relatively large;

the length of the component can be shorter than that of components hitherto known, which is of great advantage for integration with other components;

the component permits correction of the asymmetry by making use of the electro-optical activity of the polarized material of the side branch.

REFERENCES

[1] Nobuo Goto, Gar Lam Yip: "A TE-TM mode splitter in LiNbO$_3$ by proton exchange and Ti diffusion", J. Lightwave Technology, vol. 7, No. 10, October 1989, p.1567–1574.

[2] EP Patent Application No. 0290061-A entitled: Linear addition polymer with hyperpolarizable side groups.

[3] EP Patent Application No. 0344857-A entitled: Electro-optical component and method for making the same.

D. SHORT DESCRIPTION OF THE DRAWING

Figure 2:
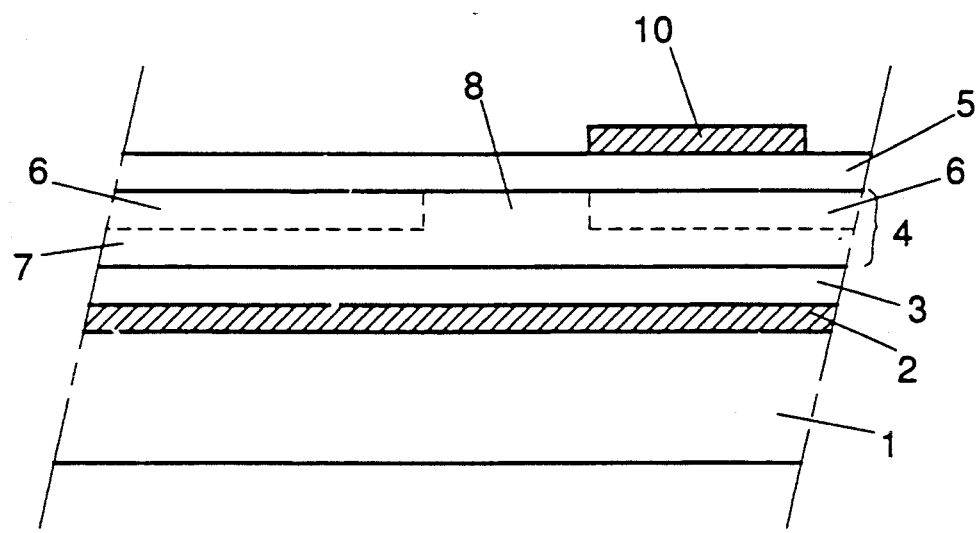

The invention will be explained in more detail by means of a description of an exemplary embodiment in which reference is made to a drawing in which: FIG. 1 is a diagrammatic depiction of an optical waveguide pattern in a plan view of a polarization splitter according to the invention, and FIG. 2 is a diagrammatic depiction of a polarization splitter according to FIG. 1, seen in a cross section along the line II.

E. DESCRIPTION OF AN EXEMPLARY EMBODIMENT

From reference [3] it is known that a transparent polable material, such as a polable glassy polymer of a type as known, inter alia, from reference [2] undergoes, on irradiation with UV light, a permanent reduction in refractive index with respect to the polable polymer in the unpoled state. For infrared light, (approximately 1300 nm) this reduction in refractive index is in the order of magnitude of n=0.03. As a result of such irradiation, the polymer enters a state in which it has lost its polability, that is to say it can be made electro-optically active by poling. These two effects have been found to be identical for both polarizations. A polable glassy polymer can be in two states, namely in an unpoled state and in a poled one, of which states the unpoled one has been found to be virtually not polarization-sensitive and the poled state very polarization-sensitive. The optical polarization splitter according to the invention is based upon this property, namely the ability to assume these three states (i.e. unpolable with reduced refractive index, polable/unpoled and polable/poled), of which only one is polarization-sensitive (viz. the polable/poled state).

A refractive index change, which the polymer undergoes on irradiation, of an order of magnitude as stated above means that strip-type optical waveguides can be provided in a thin layer of such a polable glassy polymer by selective irradiation. This implies that the polarization splitter according to the invention can be manufactured completely with the technique known from reference [3]. The description of the structure and operation thereof given below will therefore suffice.

FIGS. 1 and 2 show diagrammatically a polarization splitter according to the invention. In this connection, FIG. 1 emphasizes the geometry of the component, while FIG. 2 shows the component in a cross section along the line II in Figure Located on a substrate 1 in consecutive layers are a plate-type first electrode 2, a first buffer layer 3, a layer 4 of glassy polable polymer and a second buffer layer 5. The layer 4 comprises a region 6 irradiated with UV light and unirradiated region 7 of a form such that a Y-shaped optical waveguide pattern 8 of the "ridge"-type is provided. Said optical waveguide pattern 8 has an incoming waveguide section 8.1 and outgoing waveguide sections 8.2 and 8.3. In the present exemplary embodiment, the pattern is so chosen that the outgoing waveguide sections each recede by means of two oppositely extending, smoothly joining bends having a radius R and angle $\theta$ from the waveguide section 8.1 in order then to continue parallel to the latter at a distance D. The region from which the branching begins in the waveguide pattern 8 to that where the outgoing waveguide sections 8.2 and 8.3 again run parallel to the incoming waveguide section 8.1 is termed the branching zone 9. Said branching zone has a length $L=2R\sin\theta$. The angle $\theta$ is a measure of the effective angle at which the waveguide sections 8.2 and 8.3 branch in the branching zone 9. All the waveguide sections have an essentially equal width d. At the point where the waveguide section 8.1 begins to branch into the waveguide sections 8.2 and 8.3 a second electrode 10 is provided above (at least in the initial section of) the waveguide section 8.3 on the second buffer layer 5. The polymer material of at least the portion of the waveguide section 8.3 which is located between the electrodes 2 and 10 is converted to the poled state. (For example by heating the polymer material to above the glass transition temperature, applying a voltage, the polarization voltage, generating a strong electric field in the material between the electrodes 2 and 10 across the electrodes 2 and 10, and then cooling while maintaining the electric field). The material in this portion of the outgoing waveguide section 8.3 is therefore birefringent, with the result that the refractive index is dependent on the direction of polarization of the light. As a result of poling, the refractive index for the TM polarization increases with respect to unpoled material, while on the contrary, that for the TE polarization decreases. These changes in refractive index have direct consequences for the propagation constants in the optical waveguide pattern 8. For a TM component in a light signal incident via the incoming waveguide section 8.1, the poled waveguide section 8.3 has the highest propagation constant, but on the contrary, the unpoled waveguide section 8.2 has the highest propagation constant for a TE component. It is pointed out that only the portion of the waveguide section 8.3 up to the point where the waveguide sections 8.2 and 8.3 have to be optically decoupled needs to be poled.

The polymer used has a refractive index of 1.56 in the irradiated form for infrared light (1.3 $\mu$m) for both light polarizations, and a refractive index of 1.590 in the unirradiated unpoled form and a refractive index of 1.587 in the poled form for the TE polarization and 1.597 for the TM polarization.

In a polarization splitter produced on the basis of said polymer, having glass as substrate and having passive polyurethane buffer layers each 2.5 $\mu$m thick and a refractive index of 1.523, gold electrodes, a polymer layer 2.3 μm thick (=0.3 μm irradiated and 2.0 μm unirradiated material) and a waveguide pattern in which R=40.0 mm, d=7 μm and D=50.0 μm, a polarization split ratio of >20 dB was achieved. In this case L is in the order of 1.4 mm and $\theta \approx 0.02$ rad, while the outgoing waveguide sections are at a mutual spacing of 2D=0.1 mm. The expectation is that R can be reduced still further (by a factor of 2), with the result that the actual splitter component occupies very little space, which makes integration with other optical components attractive.

Since the splitting effect is not based on an interferometric effect, the component is in principle broad-band.

In the first instance, the polarization splitter described above is seen as a passive component, that is to say without the refractive index in the waveguide pattern being influenced in any way, such as, for example, by an electro-optical effect, while the component is being used. In such a passive component, the electrodes 2 and 10 are therefore in fact superfluous and can be removed during the component production process after the desired region of the polymer has been poled. Since the polymer is also electro-optical in the poled state and when an electric voltage is applied in accordance with the sign of the poling voltage the increase or the reduction in the refractive index for the TM and TE polarizations can still be intensified somewhat, it is advantageous to design the component as an active component by connecting the electrodes to a regulatable voltage source. This offers the possibility of correcting, with the aid of the electro-optical effect, any faults which may still nevertheless occur in the asymmetry.

We claim:

1. An optical component for splitting an incident light signal into two outgoing light signals having mutually perpendicular polarization directions, which component comprises an optical waveguide pattern provided on or in a substrate, including an essentially polarization-insensitive first channel-type optical waveguide and at least one polarization-sensitive second channel-type optical waveguide which joins the first optical waveguide as a side branch at an acute angle, characterized in that the optical waveguide pattern is composed of a transparent polable material which is in the unpoled state in the first optical waveguide and in the poled state in the second optical waveguide at least in the portion which connects directly to the first optical waveguide.

2. An optical waveguide according to claim 1, characterized in that the material is a polable glassy polymer with a polability destructible under exciting irradiation, and that the said optical waveguide pattern is provided in a thin layer of said polable glassy polymer on selective exciting irradiation.

3. An optical component according to claim 1, characterized in that the component additionally comprises partially interacting first electrodes between which, by means of a voltage difference to be applied, an electric field can be generated which operates into the poled material of the second optical waveguide, at least of that portion which connects directly to the unpoled material of the first optical waveguide.

4. An optical component according to claim 2, characterized in that the component additionally comprises partially interacting first electrodes between which, by means of a voltage difference to be applied, an electric field can be generated which operated into the poled material of the second optical waveguide, at least of that portion which connects directly to the unpoled material of the first optical waveguide.

* * * * *